Oct. 21, 1924.
G. I. WORLEY
WHEEL CHAIN
Filed Jan. 29, 1923
1,512,325
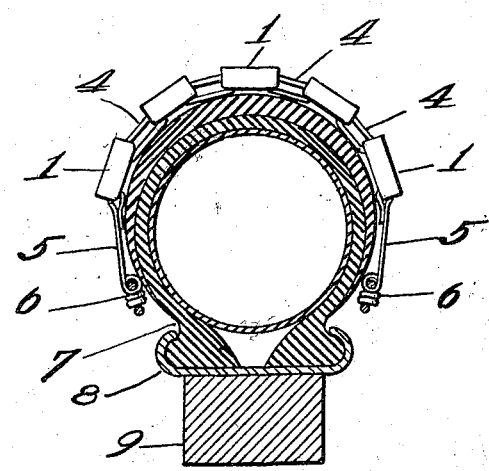
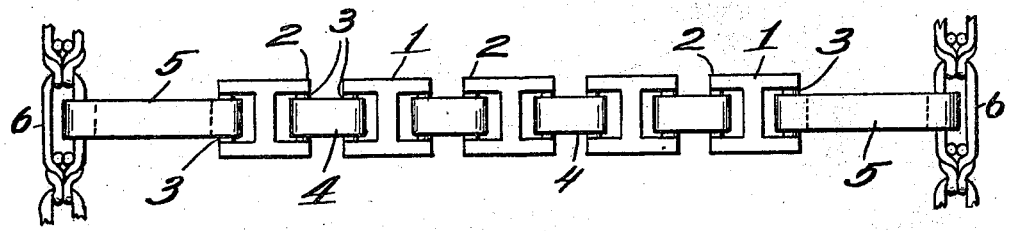
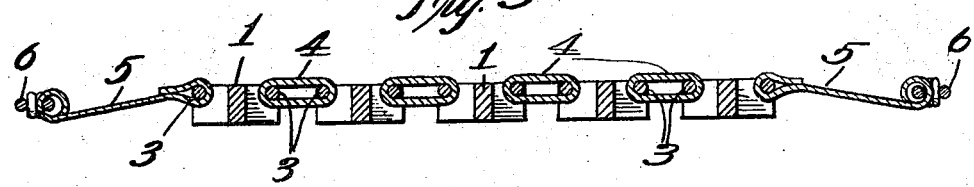
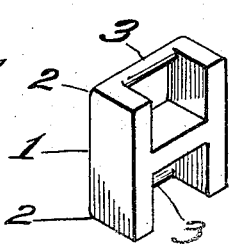
Inventor,
Geo. I. Worley.
Witness:
R. E. Hamilton
By
Thorpe & Gerard attys Patented Oct. 21, 1924.

1,512,325

UNITED STATES PATENT OFFICE.

GEORGE I. WORLEY, OF DENVER, COLORADO.

WHEEL CHAIN.

Application filed January 29, 1923. Serial No. 615,609.

*To all whom it may concern:*

Be it known that I, GEORGE I. WORLEY, a citizen of the United States, and resident of Denver, county of Denver, State of Colorado, have invented a certain new and useful Improvement in Wheel Chains, of which the following is a complete specification.

This invention relates to tire chains, and more especially to the cross members of such chains, the object being to produce cross members comprising master links for sustaining the major part of the wear and affording efficient tractional grip against slippage in all directions and connecting links protected by the master link from under wear and strain and for direct contact with the tire to protect the same largely from contact with and injury by the master links.

With the general object also of producing strong, durable and economical cross members which will insure quick and easy applications of the chains to wheels, by having one side only and obviously for contact with the tires, the invention consists in certain novel and useful features of construction and combinations of parts as hereinafter described and claimed, and in order that it may be fully understood reference is to be had to the accompanying drawing, in which:—

Figure 1 is a cross section through an automobile tire and illustrates a tire chain embodying the invention in operative relation thereto.

Figure 2 is a plan view of one of the cross chains of the invention.

Figure 3 is a central vertical section of the cross chain as shown in Figure 2.

Figure 4 is a perspective view of one of the master links of the cross chain.

In the said drawing, where like reference characters identify corresponding parts in all of the figures, 1 indicates the H-shaped master links of the cross chains, said links being rounded at their corners at one side as at 2, where they come into contact with the tire, to avoid injury to the same, as will be readily understood.

Each of the master links is formed adjacent its rounded corners 2 with cross pins 3, for engagement by a series of connecting links 4 joining the master links. It will be noted, by reference to the drawing, that the links 4 are of such length and thickness as to prevent contact between the rear or underside of the master links and the tire. The terminal master links of each set of cross chains being connected to metal straps 5, secured at their opposite ends to links of any suitable type of circumferential chains 6, as common in the art.

From an inspection of the drawing, it will be evident that the construction of the master links is such, that more than half of the material of each link may be worn away through use, before the chain is appreciably weakened by wear of the connecting links 4, and that the shape of such master links is such as to counteract very efficiently side slip and at the same time offer good traction for the driving wheels on muddy or slippery roadways.

It will be apparent that if found desirable, split connecting links 4 may be employed for the more ready replacement of a broken master link or connecting link of any cross chain. A tire chain of the type disclosed by this application will be found highly desirable not only on account of its greater wearing qualities and its good tractional engagement with the roadway, but also because it subjects the tire to but little abrasion and that only through contact with the relatively wide and flat links 4.

From the above description it will be apparent that I have produced a tire chain which possesses all of the features of advantage set forth as desirable, and while I have described and claimed the preferred embodiment of the same, I reserve the right to make all changes properly falling within the spirit and scope of the appended claims.

I claim:—

1. An automobile tire chain link comprising spaced side members, pins connecting the side members near their opposite ends; said connecting pins lying inwardly of the plane of the tread surfaces of the link.

2. An automobile tire chain comprising master links having sides, pins connecting the sides near their opposite ends, and links pivotally engaging adjacent connecting pins; said pins lying inwardly of the plane of the tread surfaces of the master links and the pivoted links protruding beyond the inner surfaces of said master links.

3. In an automobile tire chain, links of relatively H-shape and formed near their ends with connecting pins, and connecting links pivotally secured to adjacent connecting pins; said connecting pins being so arranged that the connecting links shall not contact with the roadway and shall hold the H-shaped links out of contact with the tire.

4. An automobile tire chain, comprising a pair of circumferential chains and connecting cross chains, the latter consisting of master links of relatively H-shape and formed with cross-pins at their ends and near their inner surfaces, flat links pivotally connecting the cross pins of adjacent links and protruding beyond the inner surfaces of the H-shaped links and lying wholly inwardly of the tread surfaces of the latter, and means for fastening the cross chains to the said circumferential chains.

5. In an automobile tire chain, links of relatively H-shape and formed near their ends with connecting pins, and connecting links pivotally secured to adjacent connecting pins; said connecting pins being so arranged that the connecting links shall not contact with the roadway.

In witness whereof I hereunto affix my signature.

GEORGE I. WORLEY.